(12) United States Patent
Wittmann

(10) Patent No.: US 9,340,440 B2
(45) Date of Patent: May 17, 2016

(54) METHOD FOR TREATING PROCESS WATER FROM A PLANT FOR THE HYDROTHERMAL CARBONISATION OF RENEWABLE RAW MATERIALS AND ORGANIC RESIDUES

(75) Inventor: Tobias Wittmann, Berlin (DE)

(73) Assignee: SUNCOAL INDUSTRIES GMBH, Ludwigsfelde (DE)

( * ) Notice: Subject to any disclaimer, the term of this patent is extended or adjusted under 35 U.S.C. 154(b) by 335 days.

(21) Appl. No.: 13/981,662

(22) PCT Filed: Jan. 27, 2012

(86) PCT No.: PCT/EP2012/000375
§ 371 (c)(1),
(2), (4) Date: Jul. 25, 2013

(87) PCT Pub. No.: WO2012/100954
PCT Pub. Date: Aug. 2, 2012

(65) Prior Publication Data
US 2013/0306553 A1    Nov. 21, 2013

(30) Foreign Application Priority Data
Jan. 28, 2011   (DE) .......................... 10 2011 009 775

(51) Int. Cl.
*C02F 3/02* (2006.01)
*C02F 9/00* (2006.01)
*C02F 1/04* (2006.01)
*C02F 1/66* (2006.01)
*C02F 101/30* (2006.01)
*C02F 103/26* (2006.01)

(52) U.S. Cl.
CPC ..... *C02F 9/00* (2013.01); *C02F 1/04* (2013.01); *C02F 1/66* (2013.01); *C02F 3/02* (2013.01); *C02F 2101/30* (2013.01); *C02F 2103/26* (2013.01); *C02F 2301/063* (2013.01); *C02F 2301/066* (2013.01); *Y02W 10/15* (2015.05)

(58) Field of Classification Search
None
See application file for complete search history.

(56) References Cited

U.S. PATENT DOCUMENTS

2010/0162619 A1    7/2010  Peus
2012/0103040 A1    5/2012  Wolf et al.

FOREIGN PATENT DOCUMENTS

| DE | 10 2007 062 808 A1 | 7/2008 | |
| DE | 10 2009 015 257 A1 | 10/2010 | |
| DE | CA 2757130 A1 * | 10/2010 | ............ C10L 5/366 |
| EP | 2 206 688 A1 | 7/2010 | |

* cited by examiner

*Primary Examiner* — Chester Barry
(74) *Attorney, Agent, or Firm* — Maschoff Brennan

(57) ABSTRACT

The invention relates to a method for the treatment of process water which is obtained in a plant for the hydrothermal carbonization of renewable raw materials and organic residual materials by an evaporation of process water, a condensation of the washed process steam, and a biological treatment of the process steam condensate as partial quantity or possibly as total quantity of the amount of waste water discharged from an HTC plant.

9 Claims, 2 Drawing Sheets

METHOD FOR TREATING PROCESS WATER FROM A PLANT FOR THE HYDROTHERMAL CARBONISATION OF RENEWABLE RAW MATERIALS AND ORGANIC RESIDUES

BACKGROUND OF INVENTION

This invention relates to a method for the treatment of process water which is obtained in a plant for the hydrothermal carbonization (HTC) of renewable raw materials and organic residual materials.

The field of application of the invention is the treatment of a partial quantity or the entire quantity of process water to be discharged from an HTC plant as waste water, which is obtained in the production of solid energy carriers or soil conditioners from renewable raw materials, residual materials from the agricultural, forestry and food production and organic valuable materials from the waste treatment in an HTC plant.

SUMMARY

In the present case, renewable raw materials and organic residual materials or biomass are to be understood to be vegetable biomass as well as animal metabolic products, in particular renewable raw materials such as wood, wood chips, green waste for example from garden, park and landscape maintenance, grass and paddock cuttings, plants, straw, ensilage and organic residual materials from agriculture and forestry as well as the food industry and waste disposal industry, and also peat, raw lignite, paper and sewage sludges, pomace and the like, which in the following will also be referred to as feedstocks.

Hydrothermal carbonization (HTC) furthermore is understood to be a treatment of the feedstocks in the presence of liquid water at temperatures between about 150° C. and about 300° C., wherein the feedstocks substantially are refined by splitting off water and carbon dioxide to obtain a solid material richer in carbon and poorer in oxygen. During a hydrothermal carbonization, the feedstocks are completely or partly enveloped by liquid water. The pressure during a hydrothermal carbonization at least corresponds to the saturated steam pressure of water at the chosen treatment temperature or lies above said pressure. In dependence on the kind of feedstock, the treatment temperature must reach a minimum height, wherein for feedstocks rich in sugar the same is at least about 150° C. and for feedstocks rich in cellulose and lignin the treatment temperature is at least about 180° C. In a hydrothermal carbonization, a temperature of about 300° C. is not exceeded. The duration of a hydrothermal carbonization is dependent on the desired properties of the carbonized feedstocks, such as for example carbon content, grain size, oxygen content, and can last for a period between about 30 minutes and more than 24 hours.

HTC plant furthermore is understood to be a plant for the hydrothermal carbonization of the feedstocks, which consists of several process steps which are spatially related to each other, wherein at least one hydrothermal carbonization, an introduction of the feedstocks into the hydrothermal carbonization and a discharge of the carbonized feedstocks from the hydrothermal carbonization, possibly a mechanical dewatering of the carbonized feedstocks and a thermal drying of the carbonized feedstocks are required.

Process water furthermore is understood to be the water which directly gets in contact with the feedstocks while the same are subjected to a hydrothermal carbonization, thereby is contaminated with organic and inorganic substances, and is discharged from the hydrothermal carbonization either together with the carbonized feedstocks or separately.

In the following, process steam is meant to designate evaporated process water. Process steam for example can be generated during a thermal drying of the carbonized feedstocks, an evaporation cooling of the process water discharged from the hydrothermal carbonization and/or of the carbonized feedstocks, in an evaporation plant for process water or during a hydrothermal carbonization due to the exothermicity of the carbonization process.

In the following, condensed process steam is referred to as process steam condensate.

In the following, waste water is to be understood to be the quantity of process water and process steam condensate which is discharged from an HTC plant in liquid form. The quantity of waste water substantially results from the difference between the sum of the quantity of fresh water introduced into the hydrothermal carbonization and the quantity of water split off from the feedstocks during the hydrothermal carbonization and the sum of the quantity of process water discharged from the HTC plant with the carbonized feedstocks and the quantity of process water discharged directly from the HTC plant as process steam.

According to the prior art it is advantageous to guide a part of the process water discharged from a hydrothermal carbonization as circulation water within an HTC plant and again introduce the same into the hydrothermal carbonization. The closure of process water circuits within the HTC plant hence will not change the total quantity of waste water discharged from an HTC plant corresponding to the above definition.

In the following, fresh water designates water which is not guided as circulation water within the HTC plant, but is introduced into a hydrothermal carbonization either separately or together with the feedstocks. Fresh water in particular designates the water adhering to the feedstocks, which necessarily is introduced into the HTC plant together with the same.

It is known that—even after closure of the internal process water circuits from an HTC plant—process water generally must be discharged as waste water, since the sum of the quantity of fresh water introduced into the HTC plant with the feedstocks and the quantity of water split off from the feedstocks during the hydrothermal carbonization is greater than the sum of the quantity of process water discharged from the HTC plant with the carbonized feedstocks and the quantity of process water discharged directly from the HTC plant as process steam.

It is known that during a hydrothermal carbonization the process water is contaminated with water-soluble organic substances, which can be detected e.g. by measuring the total organic carbon (TOC), and with water-soluble inorganic constituents of the feedstocks, e.g. salts, which can be detected e.g. by measuring the conductivity. Furthermore, it is known that process steam in particular is contaminated with steam-volatile, organic constituents of the process water.

There are scientific foundations for the treatment of the process water discharged from an HTC plant as waste water by an anaerobic or aerobic biological treatment. Furthermore, the treatment by activated carbon filters as well as a combination of these methods has been examined. In addition, EP 2 206 688 describes a pretreatment of the waste water by wet oxidation.

The objective of the invention is the reliable compliance with the limit values specified by legal provisions for the direct or indirect introduction of the waste water from an HTC plant by improvement of the prior art in the treatment of at least a partial quantity of the process water from a hydrothermal carbonization of the feedstocks to be discharged from an HTC plant as waste water, in particular with varying composition of the feedstocks and changing process conditions of the hydrothermal carbonization.

It is the object of the invention to provide a simplified method for the treatment of the process water to be discharged from an HTC plant as waste water, which is characterized by low operating and investment costs and is suitable to reduce the loading of the waste water with an organic and inorganic freight to such an extent that the legal limit values reliably are undershot, as they are specified e.g. in Germany by the waste water treatment associations and the Water Resources Act.

In accordance with the invention, there is proposed in particular an evaporation of process water,
a condensation of the process steam, and
a usual biological treatment of the process steam condensate as partial quantity or possibly as total quantity of the amount of waste water discharged from an HTC plant.

This object is solved by a method for the treatment of process water from an HTC plant, wherein the process water is at least partly evaporated, e.g. for 60% and more,
the process steam thus obtained is condensed, possibly after a pressure increase by compression or a pressure decrease by expansion,
the process steam condensate from the preceding stage is discharged from the HTC plant at least as partial quantity of the waste water, and
the waste water is biologically treated in a manner known per se, e.g. by aerobic or anaerobic waster water purification, biochemical oxidation, activated-sludge methods, trickling filter or bio-contactor methods, biofiltration methods, e.g. by means of wetlands, non-ventilated or ventilated waste water ponds.

BRIEF DESCRIPTION OF THE DRAWINGS

Example embodiments are described and explained with additional specificity and detail through the use of the accompanying drawings in which.

DETAILED DESCRIPTION OF EMBODIMENTS

Figure 1:
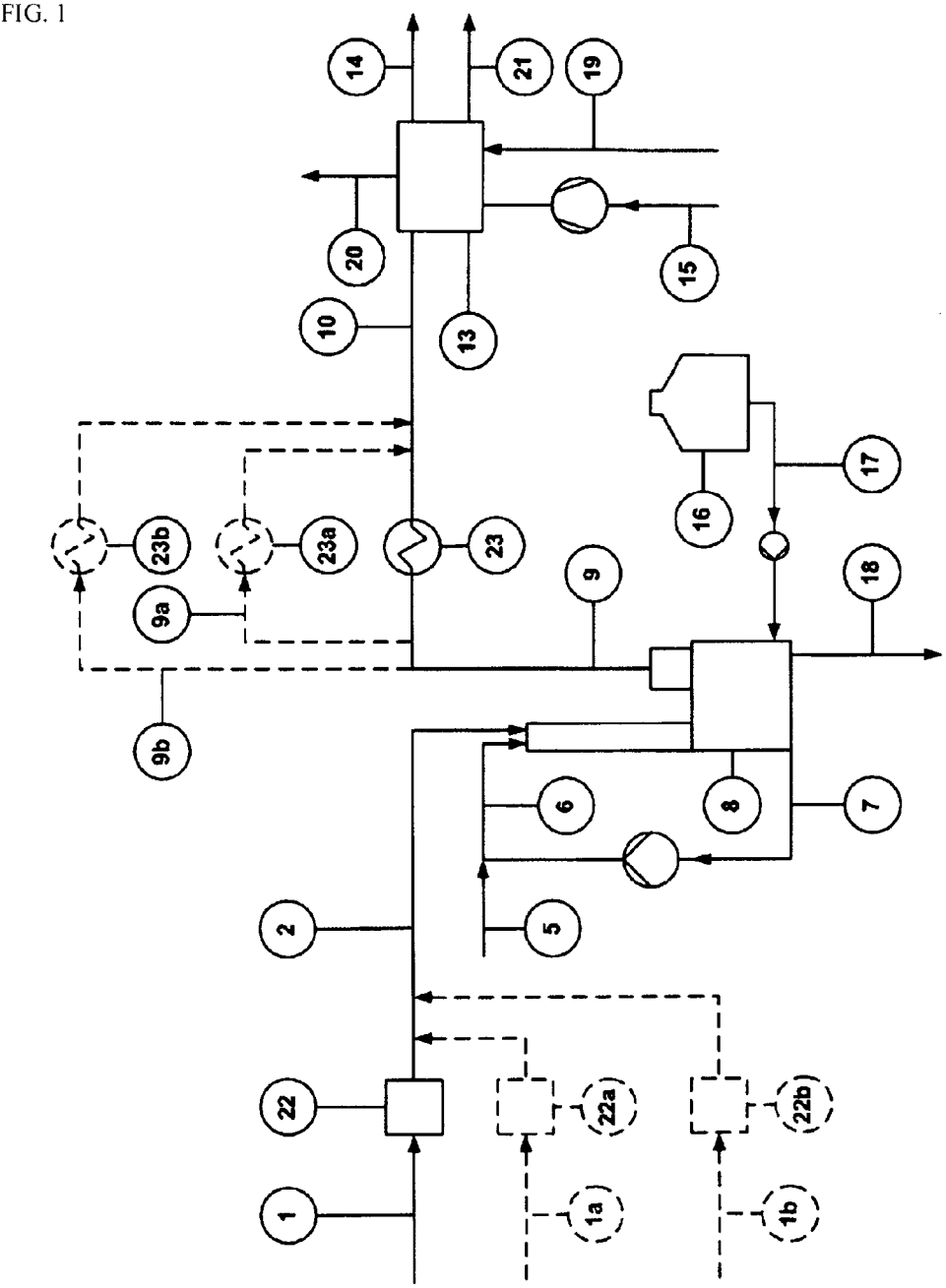
FIG. 1 illustrates an example embodiment of a system for treating process water from a plant for the hydrothermal carbonization of renewable raw materials and organic residual materials.

The essential operating principle of the present invention consists in an intensive and inexpensive reduction of the organic freight at least of a part of the waste water by the transfer of the for the most part readily biodegradable constituents of the organic freight of the process water into the vapor phase, the subsequent condensation, preferably a substantially complete condensation, of the process steam and the now possible further biological degradation of the organic freight of the process steam condensate.

The method according to the invention preferably can be designed in that the process steam obtained is washed isothermally, i.e. by largely avoiding a condensation of the process steam, and the pH value of the process steam is increased to at least 6 in the isothermal scrubber by adding a base, preferably an inorganic base, such as alkali and alkaline earth hydroxides, e.g. sodium hydroxide solution, potassium hydroxide solution, lime (milk), etc.

Due to the isothermal washing of the process steam according to the invention with a simultaneous increase of the pH value, the organic freight of the process steam and hence also of the process steam condensate is further reduced.

The method according to the invention furthermore preferably can be designed in an advantageous way in that as base, calcium hydroxide, e.g. lime milk, is introduced into the isothermal scrubber, in order to increase the pH value of the process steam, and
the sludge from the isothermal scrubber, possibly after thickening by evaporation, either is supplied to the hydrothermal carbonization or added to the carbonized feedstocks before mechanically dewatering the same or is supplied to the thermal drying.

The calcium hydroxide can be used in solid, suspended or dissolved form, e.g. in the form of aqueous solutions or suspensions, preferably in the form of lime milk.

Due to the inventive use of calcium hydroxide, in particular in the form of lime milk, for increasing the pH value of the process steam in the isothermal scrubber and the discharge of the organic salts of calcium obtained in the sludge of the isothermal scrubber at least in part together with the carbonized, dried feedstocks from the HTC plant, which is achieved by introducing the sludge into the thermal drying of the carbonized feedstocks (either directly or indirectly at least in part by introducing the sludge into the hydrothermal carbonization or the admixture to the carbonized feedstocks before mechanically dewatering the same), the yield of carbonized feedstocks is increased on the one hand, and on the other hand the carbonized feedstocks are provided with an aggregate by adding calcium, which aggregate reduces SOx emissions during their combustion and positively influences the ash melting behavior. Thus, by using lime milk for raising the pH value of the process steam in the isothermal scrubber according to the invention, the amount of lime used for flue-gas desulfurization during the combustion of the carbonized and dried feedstocks at the same time can be reduced or possibly be replaced completely and hence contribute to an improvement of the ash melting behavior.

The method according to the invention preferably can be designed in that the process water is at least partly evaporated during a thermal drying of the carbonized feedstocks in a steam atmosphere, and
the process steam thus obtained is treated further as described above.

In this connection, at least partly preferably is understood to be the amount of process water which substantially corresponds to the amount which still adheres to the carbonized feedstocks after mechanically dewatering the same minus the amount which still adheres to the carbonized feedstocks after the thermal drying.

The essential operating principle of this preferred aspect of the present invention consists in the execution of the thermal drying of the carbonized feedstocks in such a way that the process water evaporated there substantially is obtained as pure process steam which merely is contaminated by substantially steam-volatile organic compounds and minor gas evolutions of the drying carbonized feedstocks. The improvement results from the possibility of utilizing the thermal drying of the carbonized feedstocks for generating process steam, which thus is made accessible to the treatment according to the invention, in conjunction with the omission of a separate treatment of the process steam obtained in the thermal drying, possibly mixed with air, in respect of which the limit values for the emission of waste gas to the atmosphere are applicable (e.g. in Germany specified by the Technical Instructions on Air Quality (TA-Luft)).

The method according to the invention furthermore preferably can be designed in that
   the evaporation of the process water at least partly is effected during the evaporation cooling of the process water discharged from the hydrothermal carbonization and/or of the carbonized feedstocks, and
   the process steam thus obtained is treated further as described above.

Due to the inventive evaporation of process water during the evaporation cooling of the process water discharged from the hydrothermal carbonization and/or of the carbonized feedstocks, waste heat of the hydrothermal carbonization is utilized for evaporating the process water, and hence an improvement of the economy of the method according to the invention is achieved.

The method according to the invention furthermore preferably can be designed in that
   the evaporation of the process water at least partly is effected by the reaction heat released during the hydrothermal carbonization, and
   the process steam thus obtained is treated further as described above.

Due to the inventive evaporation of process water by the reaction heat released during the hydrothermal carbonization, waste heat of the hydrothermal carbonization is utilized for evaporating the process water and hence an improvement of the economy of the method according to the invention is achieved.

The method according to the invention even more preferably can be designed in that
   the water content of the feedstocks is limited to such an extent (e.g. by predewatering or sorting out feedstocks) and/or the water content of the carbonized feedstocks is adjusted in a mechanical dewatering such
      that the amount of waste water which is obtained as condensate in the thermal drying of the carbonized feedstocks in a steam atmosphere is increased to such an extent
      that only so much process water is discharged from the HTC plant as waste water without previous evaporation, as is required to adjust the ash melting behavior of the dry carbonized feedstocks to the requirements of the combustion and gasification technology in which they are to be used, and
   the process steam which is obtained during the thermal drying of the carbonized feedstocks and optionally during the evaporation cooling of the process water discharged from the hydrothermal carbonization and of the carbonized feedstocks is treated as described above.

In addition, the waste water optionally is obtained during the evaporation cooling of the process water discharged from the hydrothermal carbonization and of the carbonized feedstocks and possibly from process water evaporated by the reaction heat of the hydrothermal carbonization.

Due to the inventive limitation of the water content of the feedstocks or the utilization of the thermal drying in a steam atmosphere for evaporating additional process water, the amount of process steam condensate in the waste water of the HTC plant can further be increased and the waste water quality thereby can further be increased, wherein due to the direct discharge of a minimum quantity of process water from the HTC plant as waste water it is ensured that the requirements placed on the same by the combustion and gasification technology, in which the carbonized feedstocks are used, with regard to the ash melting behavior are complied with and the same can be burnt or gasified without any trouble.

Ash melting behavior refers to the characteristics determined according to DIN 51730, in particular the sintering temperature and softening temperature relevant for the operation of dry-bottom furnaces and gasifiers with dry ash removal. In connection with the experiments underlying this invention it was noted that the temperatures of the carbonized feedstocks characterizing the ash melting behavior sometimes are distinctly higher than those of the non-carbonized feedstocks. Furthermore, it was noted in connection with the experiments underlying this invention that this increase only can be achieved when a minimum quantity of process water is discharged from the HTC plant as waste water. When the dried carbonized feedstocks are used in dry-bottom furnaces and gasifiers with dry ash removal, which generally are operated at about 700° C. to about 1100° C., it is required that the sintering temperature of the ash is so high that no accretions are obtained in the combustion chamber and the ash softening temperature is not reached in general. When no experience values are available for the respective furnace or the respective gasifier, it can be assumed that the sintering temperature should be at least about 900° C. and the softening temperature at least about 1100° C. These values can be higher or lower in dependence on the used technology. According to the invention, it is preferred when
   (i) substantially the minimum quantity of process water is discharged from the HTC plant as waste water, which is required to raise the ash melting behavior of the carbonized feedstocks to the targeted values; there is preferably targeted an increase of the ash softening temperature to at least 1000° C., preferably at least 1100° C., and
   (ii) either the water content of the feedstocks is limited to such an extent or the evaporative capacity of the thermal drying in a steam atmosphere is increased to such an extent that the residual process water to be discharged from the HTC plant as waste water is evaporated into the steam atmosphere in the thermal drying of the carbonized feedstocks, which optionally is obtained in addition during the evaporation cooling of the process water discharged from the hydrothermal carbonization and of the carbonized feedstocks, and wherein optionally the evaporation is effected by the reaction heat of the hydrothermal carbonization.

A further preferred embodiment of the method according to the invention can be achieved in that
   substantially so much additional process steam condensate is obtained by the evaporation of process water in an evaporation plant and its subsequent condensation (possibly after a compression) and is discharged from the HTC plant as waste water, as results from the difference between the quantity of waste water and the quantity of process steam condensate from the thermal drying of the carbonized feedstocks in a steam atmosphere, and optionally from the evaporation cooling of the process water and the carbonized feedstocks discharged from the process stage of the (actual) hydrothermal carbonization, and
   from the concentrate (residue) of the process water evaporated in the evaporation plant such a quantity is discharged from the HTC plant as waste water or as waste as is required to adjust the ash melting behavior of the dry carbonized feedstocks to the requirements of the combustion and gasification technology in which they are to be used, and concentrate (residue) possibly present in addition again is introduced into the process stage of the hydrothermal carbonization or admixed to the carbonized feedstocks before mechanically dewatering the same or is supplied to the thermal drying of the carbonized feedstocks.

Said adjustment advantageously is effected by regular control measurements of the ash softening behavior of the carbonized feedstocks, wherein when the required or targeted minimum temperatures are undershot, the amount of concentrate which is discharged from the HTC plant as waste water or waste is increased, or when said temperatures are distinctly exceeded, the amount possibly also can be reduced.

The substantially complete evaporation according to the invention and the subsequent condensation of the amount of process water which must be discharged from the HTC plant as waste water provides for further increasing the waste water quality without having to make specifications as to the water content of the feedstocks and/or having to increase the evaporative capacity in the thermal drying in a steam atmosphere, but the additional evaporation of process water can be effected in an evaporation plant designed especially for this task. The evaporation plant for example can be designed as a forced-circulation evaporator. At the same time, it can thereby be ensured that the ash melting behavior of the carbonized feedstocks is not disadvantageously influenced, since the concentrate from the evaporation plant can be discharged from the HTC plant wholly or in part either as waste or in liquid form as partial quantity of the waste water, and by introducing the remaining rest of concentrate into the thermal drying of the carbonized feedstocks (either directly or indirectly at least partly by re-introducing the concentrate into the process stage of the (actual) hydrothermal carbonization or the admixture to the carbonized feedstocks before mechanically dewatering the same) the yield of dry carbonized feedstocks can be increased. When a part or the entire concentrate from the evaporation plant is discharged from the HTC plant as waste water, the amount of process steam condensate correspondingly is reduced, which is obtained and discharged from the HTC plant as waste water.

In addition, the method according to the invention even more preferably can be designed in that the evaporation plant is operated at negative pressure, and the heating of the evaporation plant is at least partly effected by the condensation of process steam which is obtained during the thermal drying of the carbonized feedstocks in a steam atmosphere.

Due to this aspect of the invention the waste heat of the drying can be used directly for the treatment of the process water by the method according to the invention and the energy efficiency can be increased thereby.

The invention also relates to all combinations of preferred aspects, as far as the same do not exclude each other. The indications "about" or "approx." in conjunction with numerical data mean that values higher or lower by at least 10% or values higher or lower by 5%, and in any case values higher or lower by 1% are included.

By "substantially" it is to be understood that there is no limitation to the ideal or exact meaning of the respective feature, so that beside the stated meaning of the feature those deviations also are comprised which still ensure the realization of the chief or predominant (technical) meaning of the feature. This means that the deviations should have no substantial or essential influence on the technical effect of the feature, such as for example small admixtures to main constituents of a mixture, measurement or error tolerances or small deviations from numerical values.

The invention will now be explained with reference to the following examples, but without being limited to the especially described embodiments. As far as nothing else is indicated or conclusively results otherwise from the context, the percentages relate to the weight, in case of doubt to the total weight of the mixture.

Exemplary Embodiment

The invention will be described by means of FIG. 1 with reference to an exemplary embodiment as follows:

Via conduit (1), process water discharged from a hydrothermal carbonization is supplied to an evaporation unit (22) in which the process water is evaporated and again discharged as process steam. From the evaporation unit, further substances which are supplied to the evaporation unit together with the process water via conduit (1) and are not discharged with the process steam can be discharged separately (not shown). The evaporation unit is heated by a heating medium (e.g. steam) which is cooled and/or condensed in the evaporation unit, and is again discharged from the same (not shown). The process steam thus obtained leaves the evaporation unit and via conduit (2) is supplied to the isothermal scrubber (8) which is operated substantially at a temperature which corresponds to the saturated steam temperature, which corresponds with the pressure existing on the evaporation side of the evaporation unit. In the present case, isothermal means that the process steam substantially is not condensed in the scrubber, but again leaves the same in the form of saturated steam. Further process water (1$a$, 1$b$, . . . ) can be evaporated via additional evaporation units (22$a$, 22$b$, . . . ) and together with the process steam obtained in (22) can be supplied to the isothermal scrubber (8) via conduit (2). Via conduit (17) a base (e.g. lime milk) is supplied to the scrubber, which base is withdrawn from a recipient tank (16). By the controlled addition of the base, the pH value of the process steam is adjusted to a value greater than 6. Via conduit (7) a part of the washing water is withdrawn from the scrubber and again fed back via conduit (6). The organic freight of the process steam separated from the process steam in the scrubber accumulates at the bottom of the scrubber and is discharged from the scrubber as sludge via conduit (18). Via conduit (5) fresh washing water is supplied to the scrubber. The process steam discharged from the scrubber via conduit (9) is condensed in a condenser (23) and via conduit (10) supplied as process steam condensate to an aerobic biological treatment (13). In the condenser, a supplied cooling medium (e.g. cooling water or process water to be evaporated) is heated and/or evaporated and again discharged from the same (not shown). The process steam (9) also can be divided into partial streams (9$a$, 9$b$, . . . ) which then are condensed in further condensers (23$a$, 23$b$, . . . ) and together with the partial stream condensed in the condenser (23) are supplied to the biological treatment via conduit (10). Into the biological treatment air is introduced via conduit (15), which together with the gaseous degradation products (substantially $CO_2$) of the organic freight of the process steam condensate again leaves the biological treatment via conduit (20). Via conduit (19) nutrients, in particular phosphorus and nitrate, are supplied to the biological treatment. The biologically treated process steam condensate leaves the biological treatment via conduit (14) and can indirectly or directly be introduced into the public sewage system. Furthermore, sewage sludge is withdrawn from the biological treatment via conduit (21).

Figure 2:
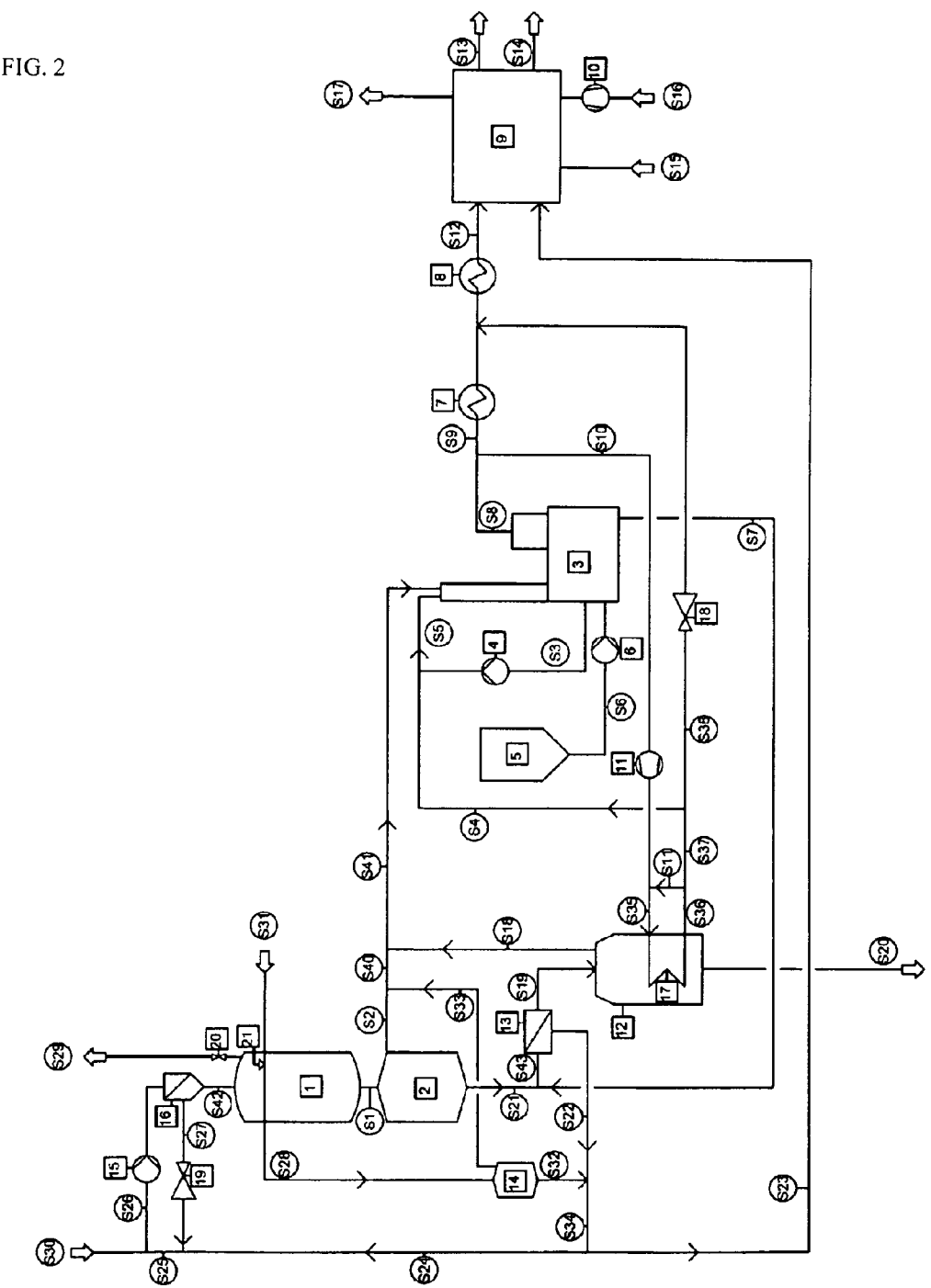
FIG. 2 illustrates another example embodiment of a system for treating process water from a plant for the hydrothermal carbonization of renewable raw materials and organic residual materials.

The invention will be described by means of FIG. 2 with reference to an exemplary embodiment as follows:

2.2 t/h of wood chips with a water content of 55% (i.e. 1.00 t/h of dry wood chips and 1.20 t/h of fresh water) are introduced as feedstock into the HTC plant via (S30), mixed with 7.80 t/h of process water (S25), supplied to a pump (15) via (S26), which pump conveys the stream and pressurizes the same with a pressure of 25 bar. In a water separation (16), 6.7 t/h of process water substantially are separated from this stream via (S27), expanded in a throttle (19) and mixed with 1.1 t/h of process water (S24) and again supplied to the feedstocks via (S25).

Via (S42), the feedstocks together with the water not separated in (16) (1 t/h of dry wood chips and 2.3 t/h of fresh and process water) are introduced into the hydrothermal carbonization, which substantially consists of a reactor (1). In the reactor a water bath (21) is disposed, into which the feedstocks are introduced and refined by splitting off 0.1 t/h of water and 0.1 t/h of permanent gas, substantially carbon dioxide, to obtain 0.8 t/h of carbonized feedstocks.

The filling level of the water bath (21) is controlled by withdrawing 0.5 t/h of process water via (S28), which process water is supplied to a means for evaporation cooling (14). Permanent gases produced (0.1 t/h) are discharged from the HTC plant via (S29) controlled by a valve (20). The process water withdrawn via (S28) is recooled to about 100° C. by generating 0.1 t/h of process steam (S33) and expanded to ambient pressure. The carbonized feedstock forms a sediment with a dry matter content of about 30% (0.8 t/h of solids and 1.9 t/h of water) at the bottom of the reactor and is discharged from the same via (S1) and recooled to about 100° C. via an evaporation cooling (2) by releasing 0.44 t/h of process steam (S2) and is expanded to ambient pressure. Via (S43), the recooled carbonized feedstocks (S21) (0.8 t/h of carbonized feedstocks and 1.46 t/h of process water) mixed with 0.16 t/h of sludge (S7) from the isothermal scrubber (3) are supplied to a mechanical dewatering (13). By mixing the sludge from the isothermal scrubber with the carbonized feedstocks, the organic salts of the calcium are at least partly supplied to the thermal drying (12) via (S19) and together with the carbonized, dried feedstocks discharged from the HTC plant via (S20).

In the mechanical dewatering (13), the carbonized feedstocks are dewatered to a dry matter content of 50%, wherein 0.82 t/h of substantially process water are separated via (S22), mixed with 0.4 t/h of recooled process water (S32) and via (S23) are in part (0.12 t/h) supplied to the aerobic biological treatment (9) and via (S24) are in part (1.1 t/h) utilized as circulation water within the HTC plant. Via (S19) the mechanically dewatered carbonized feedstock of 1.6 t/h is supplied to a drying in a steam atmosphere (12). The drying in a steam atmosphere is heated indirectly with a heat exchanger (17), in which 0.8 t/h of process steam (S35) are condensed and again discharged via (S36) as process steam condensate. During the drying, 0.73 t/h of process water are evaporated and via (S18) discharged from the drier as process steam in a steam atmosphere and together with 0.54 t/h of process steam (S40), which is obtained during the evaporation cooling of the carbonized feedstocks and of the process water (S2) discharged from the hydrothermal carbonization together with the same, and during the evaporation cooling of the process water (S33) discharged separately from the hydrothermal carbonization, is supplied to an isothermal scrubber (3) via (S41) (1.27 t/h). The dried carbonized feedstocks (0.87 t/h with a water content of 8%) are discharged from the HTC plant via (S20).

The pH value of the process steam (S41) is raised to 6 in the isothermal scrubber by adding 0.03 t/h of lime milk (S6), which is withdrawn from a lime milk tank (5) via a pump (6). Of the 1.27 t/h of process steam (S8) thus prepurified, a partial stream (S10) with 0.68 t/h is condensed to 5 bar in a condenser (11), recooled to saturated steam conditions by adding 0.12 t/h of process steam condensate via (S11), and via (S35) condensed in the heat exchanger (17) for heating the drier in a steam atmosphere (12). The 0.8 t/h of process steam condensate (S36) thus obtained, after withdrawal of 0.12 t/h for recooling the condensed process steam via (S11) and after withdrawal of the required 0.13 t/h of washing water, which is introduced into the isothermal scrubber (3) via (S4), are supplied to the biological treatment (9) via (S38) (0.55 t/h) after an expansion in (18) and possibly condensation of the flash vapors obtained during the expansion and a recooling to below 30° C. in (208) via (S12). The partial stream (S9) of the prepurified process steam (S8) in the amount of 0.59 t/h, which is not supplied to the condenser via (S10), is condensed in a heat exchanger (7), and possibly after recooling in (8) is supplied to the biological treatment (9) together with (S38) via (S12).

In the biological treatment, the organic freight of the process steam condensate (S12) and the process water (S23) is broken down by the addition of air (S16), which is conveyed via the compressor (10), to substantially obtain $CO_2$, which together with the air leaves the biological treatment via (S17). Via (S15), nutrients such as phosphorus and nitrogen are introduced into the biological treatment. The waste water leaves the biological treatment via (S13) and is introduced directly. Via (S14), sewage sludge is discharged from the biological treatment.

By the inventive procedure in this example it is achieved that of the total of 1.26 t/h of waste water 1.14 t/h (about 90%) are treated by the method according to the invention and merely 0.12 t/h (about 10%) are discharged directly as process water. By the inventive treatment of a part of the process water and its discharge from the HTC plant as waste water, the organic loading of the process water thus treated in the amount of 20,000 mg/l TOC (total organic carbon) is reduced by about 70% to 6,000 mg/l due to the evaporation, by 70% to 1,800 mg/l by increasing the pH value in the isothermal scrubber, and by 90% to 180 mg/l in the biological treatment. The treatment of the process water according to the invention, in particular the evaporation, in this example advantageously is effected without additional energy input, since the process steam is obtained during the evaporation cooling of the process water discharged from the hydrothermal carbonization and of the carbonized feedstocks and in a thermal drying of the carbonized feedstocks in a steam atmosphere. Furthermore advantageously, a part of the sludge from the isothermal scrubber is admixed to the dry, carbonized feedstocks, whereby their ash melting behavior is improved. Furthermore advantageously, 10% of the process water are discharged from the HTC plant as waste water and with the same water-soluble constituents of the ash of the feedstocks are discharged from the process and the ash melting behavior thereby likewise is positively influenced.

All values in the preceding exemplary embodiments are rounded and to be regarded as approximate values.

| Material stream | Solids | Water | Gas/Steam | Total |
|---|---|---|---|---|
| S1 | carbonized feedstock; process water | 0.8 | 1.9 | 0 | 2.7 |

-continued

| Material stream | | Solids | Water | Gas/Steam | Total |
|---|---|---|---|---|---|
| S2 | process steam | 0 | 0 | 0.44 | 0.44 |
| S4 | washing water | 0 | 0.13 | 0 | 0.13 |
| S6 | lime milk | 0 | 0.03 | 0 | 0.03 |
| S7 | sludge | 0 | 0.16 | 0 | 0.16 |
| S8 | process steam | 0 | 0 | 1.27 | 1.27 |
| S9 | process steam condensate | 0 | 0 | 0.59 | 0.59 |
| S10 | process steam | 0 | 0 | 0.68 | 0.68 |
| S11 | process steam condensate | 0 | 0.12 | 0 | 0.12 |
| S12 | process steam condensate | 0 | 1.14 | 0 | 1.14 |
| S18 | process steam | 0 | 0 | 0.73 | 0.73 |
| S19 | carbonized feedstock; process water | 0.8 | 0.8 | 0 | 1.6 |
| S20 | carbonized feedstock; process water | 0.8 | 0.07 | 0 | 0.87 |
| S21 | carbonized feedstock; process water | 0.8 | 1.46 | 0 | 2.26 |
| S22 | process water | 0 | 0.82 | 0 | 0.82 |
| S23 | process water | 0 | 0.12 | 0 | 0.12 |
| S24 | process water | 0 | 1.1 | 0 | 1.1 |
| S25 | process water | 0 | 7.8 | 0 | 7.8 |
| S26 | feedstock; fresh water; process water | 1 | 9 | 0 | 10 |
| S27 | process water | 0 | 6.7 | 0 | 6.7 |
| S28 | process water | 0 | 0.5 | 0 | 0.5 |
| S29 | permanent gas | 0 | 0 | 0.1 | 0.1 |
| S30 | feedstock; fresh water | 1 | 1.2 | 0 | 2.2 |
| S32 | process water | 0 | 0.4 | 0 | 0.4 |
| S33 | process steam | 0 | 0 | 0.1 | 0.1 |
| S34 | process water | 0 | 1.22 | 0 | 1.22 |
| S35 | process steam | 0 | 0 | 0.8 | 0.8 |
| S36 | process steam condensate | 0 | 0.8 | 0 | 0.8 |
| S37 | process steam condensate | 0 | 0.68 | 0 | 0.68 |
| S38 | process steam condensate/ process water | 0 | 0.55 | 0 | 0.55 |
| S40 | process steam | 0 | 0 | 0.54 | 0.54 |
| S41 | process steam | 0 | 0 | 1.27 | 1.27 |
| S42 | feedstock; fresh water; process water | 1 | 2.3 | 0 | 3.3 |
| S43 | carbonized feedstock; process water | 0.8 | 1.62 | 0 | 2.42 |

LIST OF REFERENCE NUMERALS

FIG. 1

1 conduit (process water)
1a further process water
1b further process water
2 conduit (process steam)
5 conduit (washing water))
6 conduit (washing water)
7 conduit (washing water)
8 (isothermal) scrubber
9 conduit (process steam)
9a partial streams (process steam)
9b partial streams (process steam)
10 conduit (process steam condensate)
13 (aerobic) biological treatment
14 conduit (process steam condensate, treated)
15 conduit (air)
16 recipient tank
17 conduit (base)
18 conduit (sludge)
19 conduit (nutrients)
20 conduit (air, degradation products)
21 conduit (sewage sludge)
22 evaporation unit
22a additional evaporation units
22b additional evaporation units
23 condenser
23a further condensers
23b further condensers

FIG. 2

S1 carbonized feedstock; process water
S2 process steam
S4 washing water
S6 lime milk
S7 sludge
S8 process steam
S9 process steam condensate
S10 process steam
S11 process steam condensate
S12 process steam condensate
S18 process steam
S19 carbonized feedstock; process water
S20 carbonized feedstock; process water
S21 carbonized feedstock; process water
S22 process water
S23 process water
S24 process water
S25 process water
S26 feedstock, fresh water, process water
S27 process water
S28 process water
S29 permanent gas (chiefly $CO_2$, traces of CO, $H_2$)
S30 feedstock, process water
S32 process water
S33 process steam
S34 process water
S35 process steam
S36 process steam condensate
S37 process steam condensate
S38 process steam condensate, process water
S40 process steam
S41 process steam
S42 feedstock, fresh water, process water
S43 feedstock, fresh water, process water
1 reactor
2 evaporation cooler
3 isothermal scrubber
5 lime milk tank
6 pump
8 recooling
9 (aerobic) biological treatment
10 blower
11 condenser
12 thermal drying/drier in steam atmosphere
13 (mechanical) dewatering
14 heat exchanger/evaporation cooling
15 pump
16 heat exchanger/water separation
17 heat exchanger
18 expansion
19 throttle
20 valve
21 water bath

The invention claimed is:
1. A method for the treatment of waste water from a plant for the hydrothermal carbonization of feedstocks (HTC plant), wherein
process water is partly evaporated,
the process steam thus obtained is condensed, the process steam condensate thus obtained is discharged from the HTC plant at least as partial quantity of waste water, and the waste water is biologically treated, characterized in that the steps of one of the following alternatives (A) or (B) are carried out, namely either:

the steps of alternative (A) that:

(A-1) a minimum quantity of process water is discharged from the HTC plant as waste water, which is required to raise the ash melting behavior of the carbonized feedstocks in such a way that an increase of an ash softening temperature to at least 1000° C. is achieved, and (A-2) in addition to step (A-1), either (a) the water content of the feedstocks is limited to such an extent or (b) the evaporative capacity of a thermal drying of the carbonized feedstocks in a steam atmosphere is increased to such an extent that the residual process water to be discharged from the HTC plant as waste water is evaporated in steam atmosphere in the thermal drying, or the steps of alternative (B) that:

(B-1) so much additional process steam condensate is obtained by the evaporation of process water in an evaporation plant and its subsequent condensation and is discharged from the HTC plant as waste water, as results from the difference between the quantity of waste water and the quantity of process steam condensate from a thermal drying of the carbonized feedstocks in a steam atmosphere, and (B-2) in addition to step (B-1), from a concentrate of the process water evaporated in the evaporation plant such a quantity is discharged from the HTC plant as waste water or as waste as is required to adjust the ash melting behavior of the dry carbonized feedstocks in such a way that the ash softening temperature does not fall below a defined minimum, and (B-3) in addition to carrying out steps (B-1) and (B-2), in case additional concentrate is present in this concentrate:

is introduced into the hydrothermal carbonization or admixed to the carbonized feedstocks before mechanically dewatering the same or is supplied to the thermal drying of the carbonized feedstocks.

2. The method according to claim 1, characterized in that the residual process water to be discharged from the HTC plant as waste water and being evaporated in steam atmosphere in the thermal drying is, in addition, obtained during an evaporation cooling of the process water discharged from the hydrothermal carbonization and/or of the carbonized feedstocks.

3. The method according to claim 1, characterized in that so much additional process steam condensate is obtained by the evaporation of process water in an evaporation plant and its subsequent condensation and is discharged from the HTC plant as waste water, as results from the difference between the quantity of waste water and the quantity of process steam condensate from a thermal drying of the carbonized feedstocks in a steam atmosphere, and from an evaporation cooling of the process water from the hydrothermal carbonization and from the hydrothermal carbonization and/or of the carbonized feedstocks.

4. The method according to claim 1, characterized in that the condensation of the process steam is effected after a pressure increase by compression or an pressure decrease by expansion.

5. The method according to claim 4, characterized in that the process steam is substantially completely condensed.

6. The method according to claim 1, characterized in that the process steam is washed isothermally, and the pH value of the process steam is increased to at least 6 in the isothermal scrubber by adding a base.

7. The method according to claim 6, characterized in that as base lime milk is introduced into the isothermal scrubber, in order to increase the pH value of the process steam, and the sludge of the isothermal scrubber either is supplied to the hydrothermal carbonization or added to the carbonized feedstocks before mechanically dewatering the same or is supplied to the thermal drying.

8. The method according to claim 1, characterized in that an evaporation plant of the HTC plant is operated at negative pressure, and the heating of the evaporation plant is at least partly effected by the condensation of process steam which is obtained during the thermal drying of the carbonized feedstocks in a steam atmosphere.

9. The method according to claim 1 characterized in that a minimum quantity of process water is discharged from the HTC plant as waste water, which is required to raise the ash melting behavior of the carbonized feedstocks to the targeted values in such a way that an increase of the ash softening temperature to at least 1100° C. is achieved.

* * * * *